US010459387B2

(12) United States Patent
Tani et al.

(10) Patent No.: US 10,459,387 B2
(45) Date of Patent: Oct. 29, 2019

(54) IMAGE FORMING APPARATUS AND CONTROL METHOD THEREOF

(71) Applicant: Sharp Kabushiki Kaisha, Sakai, Osaka (JP)

(72) Inventors: Takeshi Tani, Sakai (JP); Mikiya Okada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/045,787

(22) Filed: Jul. 26, 2018

(65) Prior Publication Data

US 2018/0335738 A1 Nov. 22, 2018

Related U.S. Application Data

(63) Continuation of application No. 13/275,998, filed on Oct. 18, 2011, now Pat. No. 10,061,248.

(30) Foreign Application Priority Data

Oct. 18, 2010 (JP) ................................ 2010-233429

(51) Int. Cl.
*G06F 15/00* (2006.01)
*G03G 15/00* (2006.01)

(52) U.S. Cl.
CPC ....... *G03G 15/502* (2013.01); *G03G 15/5087* (2013.01); *G03G 2215/00109* (2013.01)

(58) Field of Classification Search
CPC .............. G03G 15/502; G03G 15/5087; G06F 3/1254; G06F 3/1204; G06F 3/1207; G06F 3/1211; G06F 3/1273
USPC ............................................... 358/1.13, 1.15
See application file for complete search history.

(56) References Cited

U.S. PATENT DOCUMENTS

2006/0092453 A1* 5/2006 Okada ................ H04N 1/00411 358/1.14
2010/0134826 A1* 6/2010 Ishigure ............... H04N 1/0035 358/1.15

OTHER PUBLICATIONS

Tani et al., "Image Forming Apparatus and Control Method Thereof", U.S. Appl. No. 13/275,998, filed Oct. 18, 2011.

* cited by examiner

*Primary Examiner* — Mark R Milia
(74) *Attorney, Agent, or Firm* — Keating & Bennett, LLP

(57) ABSTRACT

An image forming apparatus includes a display device that displays an input screen image and a touch-panel arranged on the display device, and has a trial copy function of producing, when instructed to produce multiple copies of a document, a copy or a copies to allow the user to confirm that the copy or copies are well. When the trial copy function is designated and a copy start key displayed on the input screen image is pressed, the image forming apparatus produces one copy or copies of the document, erases the copy start key from the input screen image, and displays a trial copy key, a trial end key and a balloon including help information. Since keys related to the trial copy are displayed in place of normally displayed keys, operation errors can be reduced and the user can easily execute the trial copy function.

10 Claims, 13 Drawing Sheets

IMAGE FORMING APPARATUS AND CONTROL METHOD THEREOF

CROSS-REFERENCE TO RELATED APPLICATION

This nonprovisional application claims priority under 35 U.S.C. § 119(a) on Patent Application No. 2010-233429 filed in Japan on Oct. 18, 2010, the entire contents of which are hereby incorporated by reference.

BACKGROUND OF THE INVENTION

Field of the Invention

The present invention relates to an image forming apparatus and, more specifically, to an image forming apparatus having a trial copy function and a control method thereof.

Description of the Background Art

Recently, image forming apparatuses including copy machines having various and many copy functions and capable of high-speed copying have been put on the market. As the number of functions increases, it becomes difficult to handle skillfully the various and many functions of the device except for users who are familiar with such a device through daily use. Miscopies resulting from errors in operations for setting copy conditions are likely. Even if the user finds the setting error immediately after starting the copy, in a high-speed copy machine, a large number of copies would be taken before the once-started copy operation stops, wasting resources.

Therefore, high-speed copiers having a "trial copy function" of providing only one copy before outputting a plurality of number of copies, and thereby allowing the user to confirm finished state, have been commercially available. Further, apparatuses having a function of displaying an expected state of an output image (preview function) on a display screen of an operation panel, and thereby allowing the user to confirm, have also been commercially available. Techniques related to copiers having the "trial copy function" and "preview function" are disclosed, for example, in Japanese Patent Laying-Open No. 2007-160790 (hereinafter referred to as '790 Reference).

'790 Reference discloses a function allowing confirmation of output result before starting copying, by selecting either the "trial copy" or "preview display." The user selects a desired course from an operation screen image displayed on a display unit of a touch-panel.

Specifically, on an operation display unit shown in FIG. 2 of '790 Reference, a liquid crystal display unit allowing touch input is provided near the central portion. On the right side of liquid crystal display unit, a group of hard keys (operation unit) including ten keys, an interruption key and a start key is provided, and a hard key for selecting the "trial copy" mode is provided therein. If the trial copy key is operated, the copy executed immediately thereafter will be in the trial copy mode. Specifically, after a document is scanned and read, the image based on the read image is not formed but once displayed as a preview image on the operation screen image (liquid crystal display unit) (see FIG. 6 of '790 Reference). By operating a page feed key (left/right arrows for changing the display page, on the right side of preview image) displayed together with the preview image, it is possible to confirm the preview images by turning the preview images one by one. By touching "print stop" or "print continue" displayed at an upper right portion of the same screen display, it is possible to stop or continue the trial copy mode.

According to the operation specification disclosed in '790 Reference, keys having "print continue" and "print stop" indications thereon exist on the display screen and, in addition, a "start" key and a "clear/stop" key exist on the operation unit. The "print continue" and "print stop" can also be interpreted as start and stop of printing, respectively. This may leads to user's confusion as to which of the keys on the display screen and the keys on the operation unit are to be operated. Such a situation possibly causes erroneous operations of the user and, hence, there is still a possibility of miscopies, particularly a large number of miscopies in high-speed copiers.

SUMMARY OF THE INVENTION

In view of the problem described above, it is desirable to provide an image forming apparatus allowing the user to execute the trial copy function in safety, without causing erroneous operation by the user.

According to an aspect, the present invention provides an image forming apparatus including a display unit that displays an information input screen image allowing input of information, and an input unit that is arranged on the display unit and specifies a designated position on the information input screen image, and having a trial copy function of producing, when an instruction to produce multiple set of copies of a one- or multi-page document is given, a copy or a set of copies to allow a user to confirm that the copy or the set of copies are well; wherein if the trial copy function is designated and a position of one or a plurality of copy start keys displayed on the information input screen image is specified by the input unit, after the copy or the set of copies of the document are provided, the display unit erases the one or a plurality of copy start keys from the information input screen image, and displays a first key for executing the trial copy and a second key for producing copies of remaining number of set number of copies, on the information input screen image.

Preferably, the display unit changes the one or a plurality of copy start keys to the first key or the second key.

More preferably, the plurality of copy start keys include a monochrome copy start key and a color copy start key; and the display unit changes the monochrome copy start key and the color copy start key to the first key or the second key.

Further preferably, the input unit is a touch-panel.

Preferably, the first and second keys are displayed on an area of the information input screen image including an area where the one or a plurality of copy start keys are displayed adjacent to and parallel to each other.

More preferably, the display unit displays first help information near the first key or the second key.

Further preferably, the display unit displays second help information having the first help information of reduced amount, in place of the first help information in a prescribed situation.

Preferably, the prescribed situation is when a piece of information to be newly displayed on the information input screen image is overlapped on the first help information, or when a position on the first help information displayed on the information input screen image is specified by the input unit.

More preferably, the display unit displays the first help information in place of the second help information, if a position on the second help information displayed on the information input screen image is specified by the input unit.

Further preferably, the display unit erases the copy start key from the information input screen image, displays a stop copy key to stop copying on the information input screen image and displays third help information near the stop copy key, in a time period from when the trial copy function is designated until one copy of the document is produced.

According to another aspect, the present invention provides a method of controlling an image forming apparatus that includes a display unit that displays an information input screen image allowing input of information, and an input unit that is arranged on the display unit and specifies a designated position on the information input screen image, and has a trial copy function of producing, when an instruction to produce multiple set of copies of a one- or multi-page document is given, a copy or a set of copies to allow a user to confirm that the copy or the set of copies are well. The method includes the steps of; determining whether or not the trial copy function is designated; determining whether or not a position on one or a plurality of copy start keys displayed on the information input screen image is specified by the input unit; and if it is determined that the trial copy function is designated and a position on one or a plurality of copy start keys displayed on the information input screen is specified by the input unit, producing the copy or the set of copies of the document, erasing the one or a plurality of copy start keys from the information input screen image, and displaying a first key for executing the trial copy and a second key for producing copies of remaining number of set number of copies, on the information input screen image.

Preferably, at the step of displaying the first and second keys on the information input screen image, the one or a plurality of copy start keys are changed to the first key or the second key.

More preferably, the plurality of copy start keys include a monochrome copy start key and a color copy start key; and at the step of displaying the first and second keys on the information input screen image, the monochrome copy start key and the color copy start key are changed to the first key or the second key.

Further preferably, the input unit is a touch-panel.

Preferably, the first and second keys are displayed on an area of the information input screen image including an area where the one or a plurality of copy start keys are displayed adjacent to and parallel to each other.

More preferably, the control method further includes the step of displaying first help information near the first key or the second key.

Further preferably, the control method further includes the step of displaying second help information having the first help information of reduced amount, in place of the first help information, in a prescribed situation.

Preferably, the prescribed situation is when a piece of information to be newly displayed on the information input screen image is overlapped on the first help information, or when a position on the first help information displayed on the information input screen image is specified by the input unit.

More preferably, the control method further includes the step of displaying the first help information in place of the second help information, if a position on the second help information displayed on the information input screen image is specified by the input unit.

Further preferably, the control method further includes the step of erasing the copy start key from the information input screen image, displaying a stop copy key to stop copying on the information input screen image and displaying third help information near the stop copy key, in a time period from when the trial copy function is designated until one copy of the document is produced.

According to the present invention, a touch-panel is adopted as the information input device of an image forming apparatus, and in the trial copy mode, a trial copy key and a trial end key are displayed in place of the copy start key normally displayed on the task trigger area. Thus, error of key operation by the user can be prevented.

Further, when one copy is to be printed as the trial copy, the user instructs copying by the normal copy start key and, thereafter, the trial copy key is displayed on the area where the normal copy start key has been displayed. Therefore, it is possible for the user to instruct trial copy with the same feeling of operation.

Further, since help information related to the operation is displayed in a balloon near the keys operable in the trial copy mode, error in key operations by the user can further be reduced.

Further, when a sub-screen (window) for function setting or the like is displayed to receive user operation, the balloon is displayed in a smaller size and, therefore, the balloon does not interfere with the operation by the user. Further, the balloon is not completely erased but left to indicate presence of help information, allowing the user to operate with ease.

Further, while one copy is printed as a trial copy, unnecessary operation keys are hidden by the balloon and, therefore, error in key operations by the user during printing of one copy can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
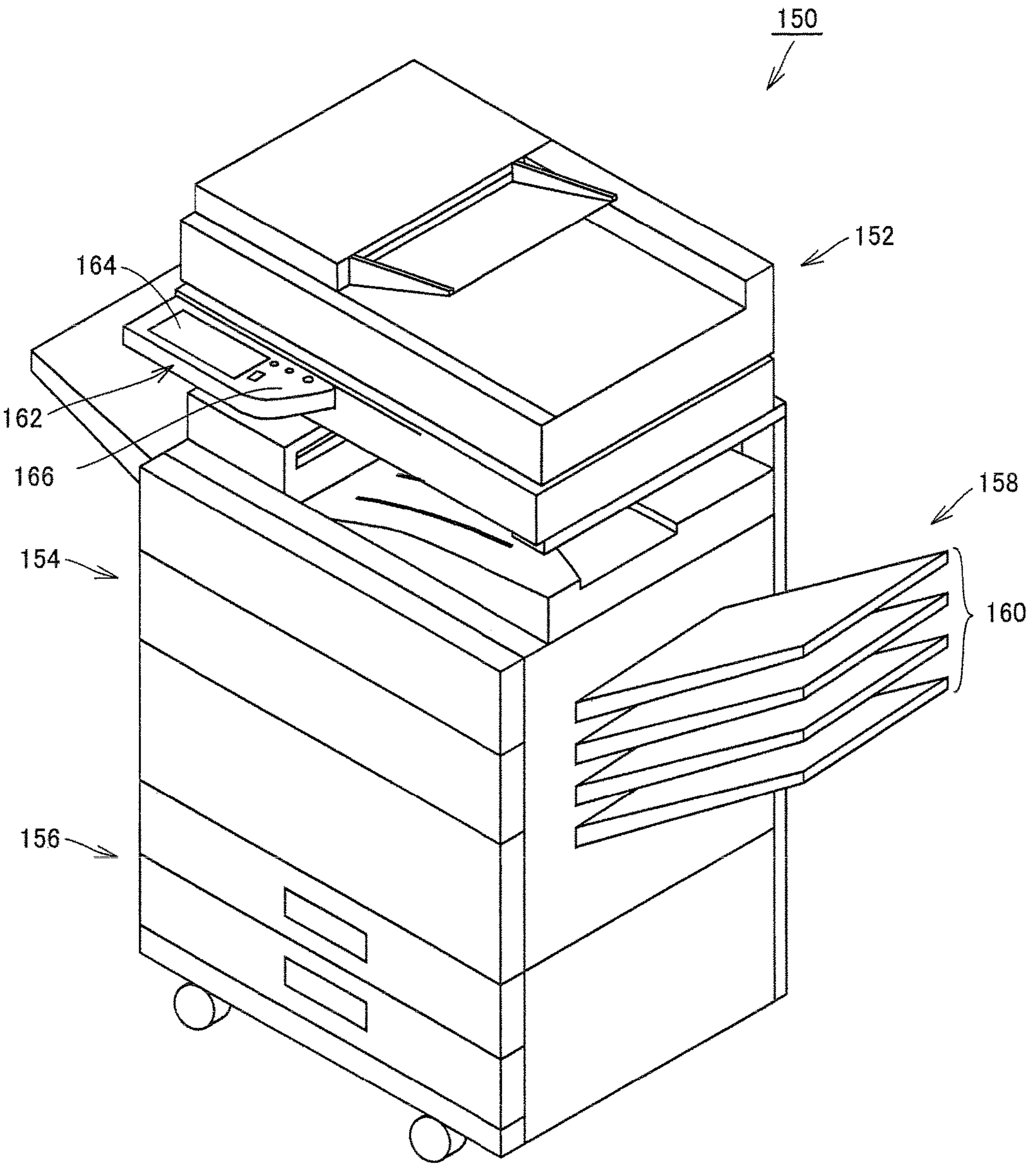
FIG. 1 is a perspective view showing an appearance of an image forming apparatus in accordance with an embodiment of the present invention.

In the following description and the drawings, the same components are denoted by the same reference characters. Their names and functions are also the same. Therefore, detailed description thereof will not be repeated.

In the following, embodiments of the present invention will be specifically described with reference to appended figures.

<Image Forming Apparatus>

Referring to FIG. 1, an image forming apparatus 150 in accordance with an embodiment of the present invention includes: a document reading unit 152; an image forming unit 154; a paper feed unit 156; a discharge unit 158 having a paper discharge tray 160; and an information input device 162. Information input device 162 is an operation console causing image forming apparatus 150 to execute prescribed functions, for making various settings related to the image forming apparatus 150. Information input device 162 has a display unit 164 and an operation unit 166.

<Hardware Blocks>

Figure 2:
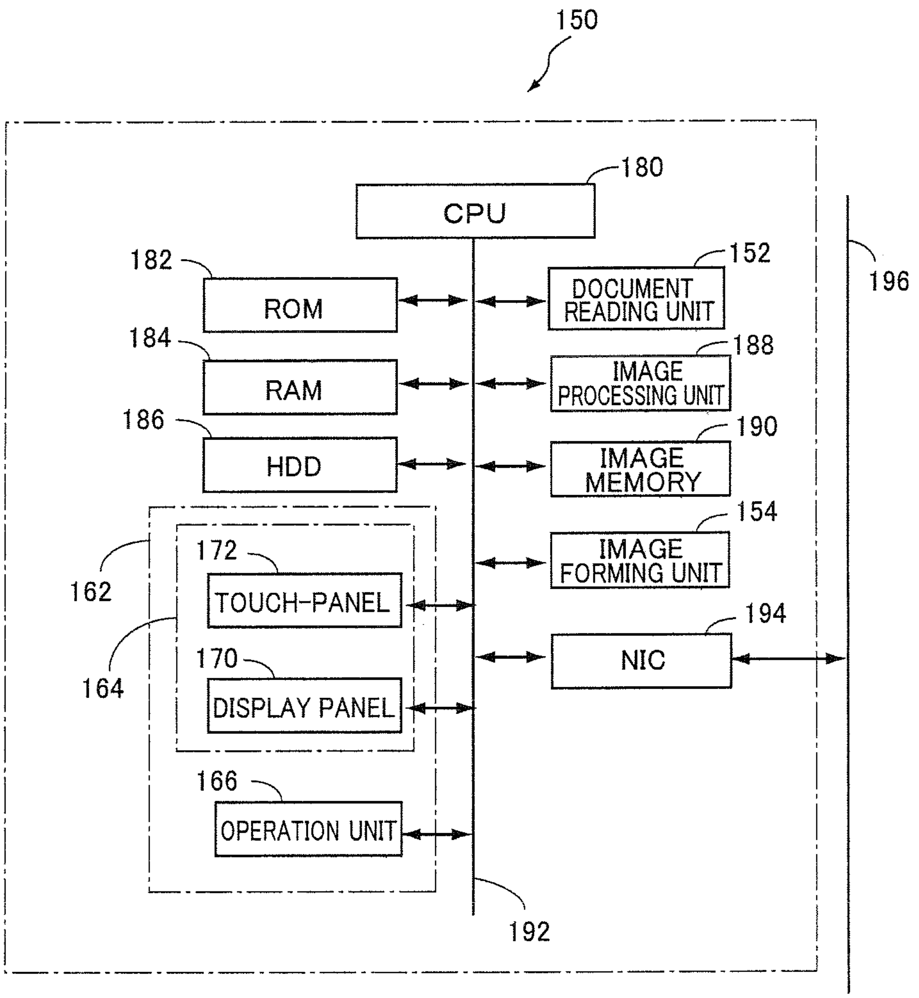
FIG. 2 is a functional block diagram showing hardware configuration of the image forming apparatus shown in FIG. 1.

Referring to FIG. 2, inside image forming apparatus 150, a CPU (Central Processing Unit) 180, an ROM (Read Only Memory) 182, an RAM (Random Access Memory) 184 and a HDD (Hard Disk Drive) 186 are provided. CPU 180 is for overall control of image forming apparatus 150. ROM 182 stores programs and the like. RAM 184 is volatile storage. HDD 186 is non-volatile storage that retains data even when power is turned off. ROM 182 stores programs and data necessary for controlling operations of image forming apparatus 150. Display unit 164 of information input device 162 is formed of a display panel 170 and a touch-panel 172. Display panel 170 is a display device such as a liquid crystal display, and touch-panel 172 for detecting a pressed position is superposed thereon.

Image forming apparatus 150 is further provided with an image processing unit 188, an image memory 190, a bus 192 and an NIC (Network Interface Card) 194. CPU 180, ROM 182, RAM 184, HDD 186, information input device 162 (display panel 170, touch-panel 172 and operation unit 166), NIC 194, document reading unit 152, image processing unit 188, image memory 190, image forming unit 154 and the like are connected to bus 192. Data (including control information) are exchanged among these units through bus 192. CPU 180 reads a program from ROM 182 to RAM 184 through bus 192, and executes the program using a part of RAM 184 as a work area. Specifically, CPU 180 controls various units forming image forming apparatus 150 in accordance with a program or programs stored in ROM 182, to realize various functions of image forming apparatus 150. NIC 194 is connected to an external network 196, and functions as an interface for communication through network 196.

<Information Input Device>

Figure 3:
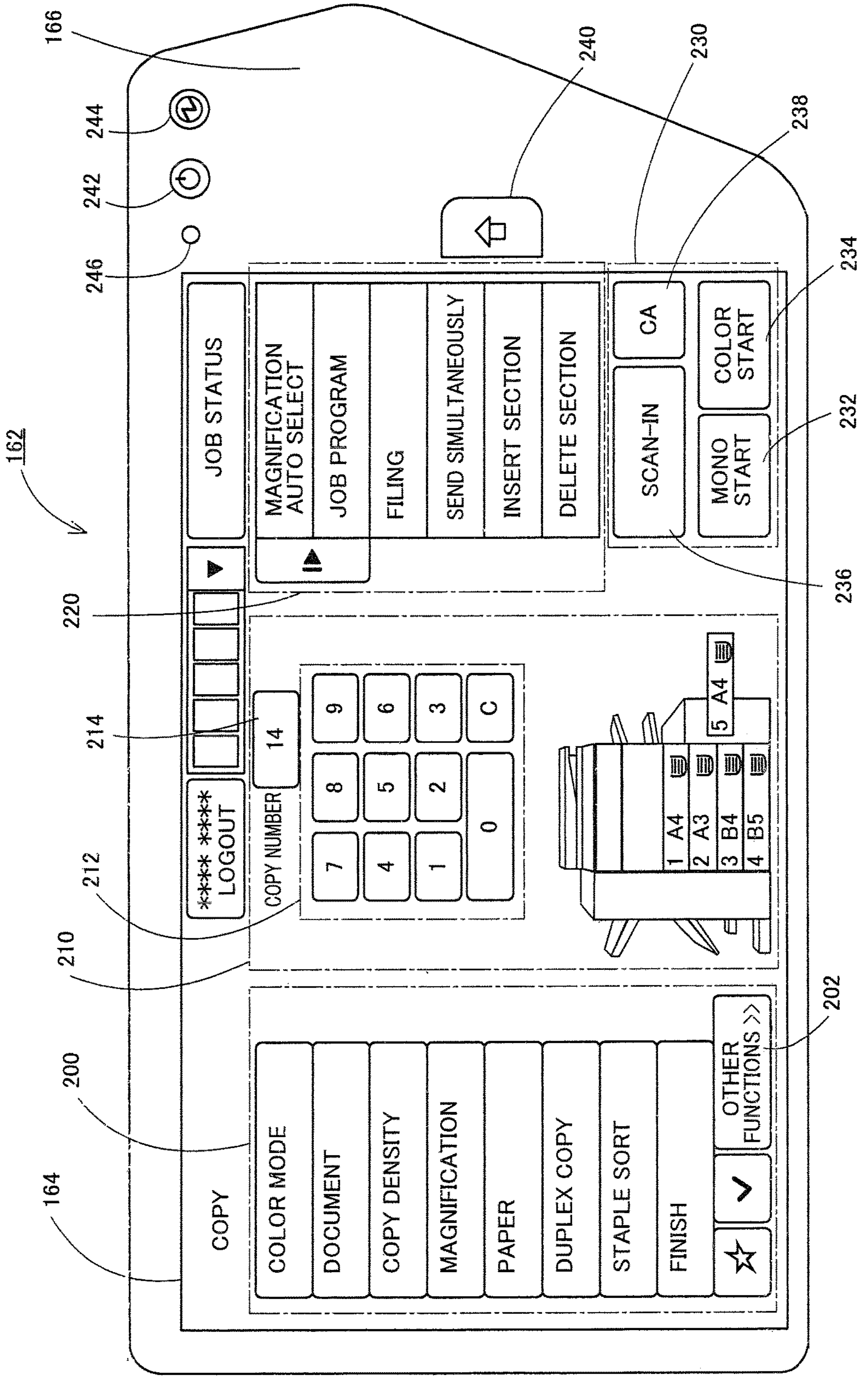
FIG. 3 is a plan view showing an information input device provided on the image forming apparatus shown in FIG. 1.

Referring to FIG. 3, information input device 162 is formed by integrating display unit 164 and operation unit 166. Specifically, operation unit 166 includes a home key 240, a power key 242 and a power save key 244 as hard keys, and a power LED 246. Power key 242 is for turning on/off the power supply to image forming apparatus 150. Power save key 244 is for setting image forming apparatus 150 to a power save mode. Power LED 246 is lit when the power of image forming apparatus 150 is turned on. Home key 240 is a key for displaying a home screen image (a screen image on which frequently used functions are registered) on display unit 164.

The screen image displayed on display unit 164 includes a function setting area 200, a preview area 210, an action panel area 220 and a task trigger area 230. On function setting area 200, a plurality of keys (hereinafter also referred to as function setting keys) for setting various functions of image forming apparatus 150 are displayed. On function setting area 200 of FIG. 3, only a part of function setting keys is displayed. Function setting keys that are not displayed appear if "other functions" key 202 is pressed. Preview area 210 includes a ten key area 212 and a copy number display area 214. The number of copies is input by the ten keys arranged on ten key area 212. In FIG. 3, the number of copies is set to 14.

On action panel area 220, pieces of information related to assistance, guidance and suggestion related to the operation are displayed. For instance, if a user selects a specific function, functions related to the selected function are displayed on action panel area 220. Other functions for objects common to the selected function may be displayed.

On task trigger area 230, keys as triggers causing image forming apparatus 150 to start certain processes are displayed. Specifically, a monochrome start key 232, a color start key 234, a scan-in key 236 and a CA key 238 are displayed. Monochrome start key 236 is for starting monochrome copy. Color start key 234 is for starting color copy. Scan-in key 236 is for starting a process for once reading a document and providing a preview for copying or for FAX transmission. CA key 238 is for clearing all settings.

In information input device 162, the state of image forming apparatus 150 and the job processing status are confirmed, by screen images displayed on display panel 170. By selecting a key displayed on display panel 170 on touch-panel 172 superposed on display panel 170 (pressing the corresponding portion of touch-panel 172), function setting or operation instruction to image forming apparatus 150 can be realized.

In information input device 162, to determine whether or not a displayed key is pressed, known technique may be used. By way of example, correspondence between two-dimensional coordinates of touch-panel 172 and two-dimensional coordinates of display panel 170 is determined beforehand, and whether or not the position pressed on touch-panel 172 is included in any area of a letter or a figure displayed on display panel 170 is determined.

<Software Configuration>

In the following, a process in which information input device 162 is operated by the user and image forming apparatus 150 realizes the trial copy operation will be described. In the following, various processes are realized by CPU 180 executing programs read from ROM 182. In the following, that a prescribed area displayed on display panel 170 (for example, a key) is pressed means that a corresponding portion of touch-panel 172 is pressed.

Figure 4:
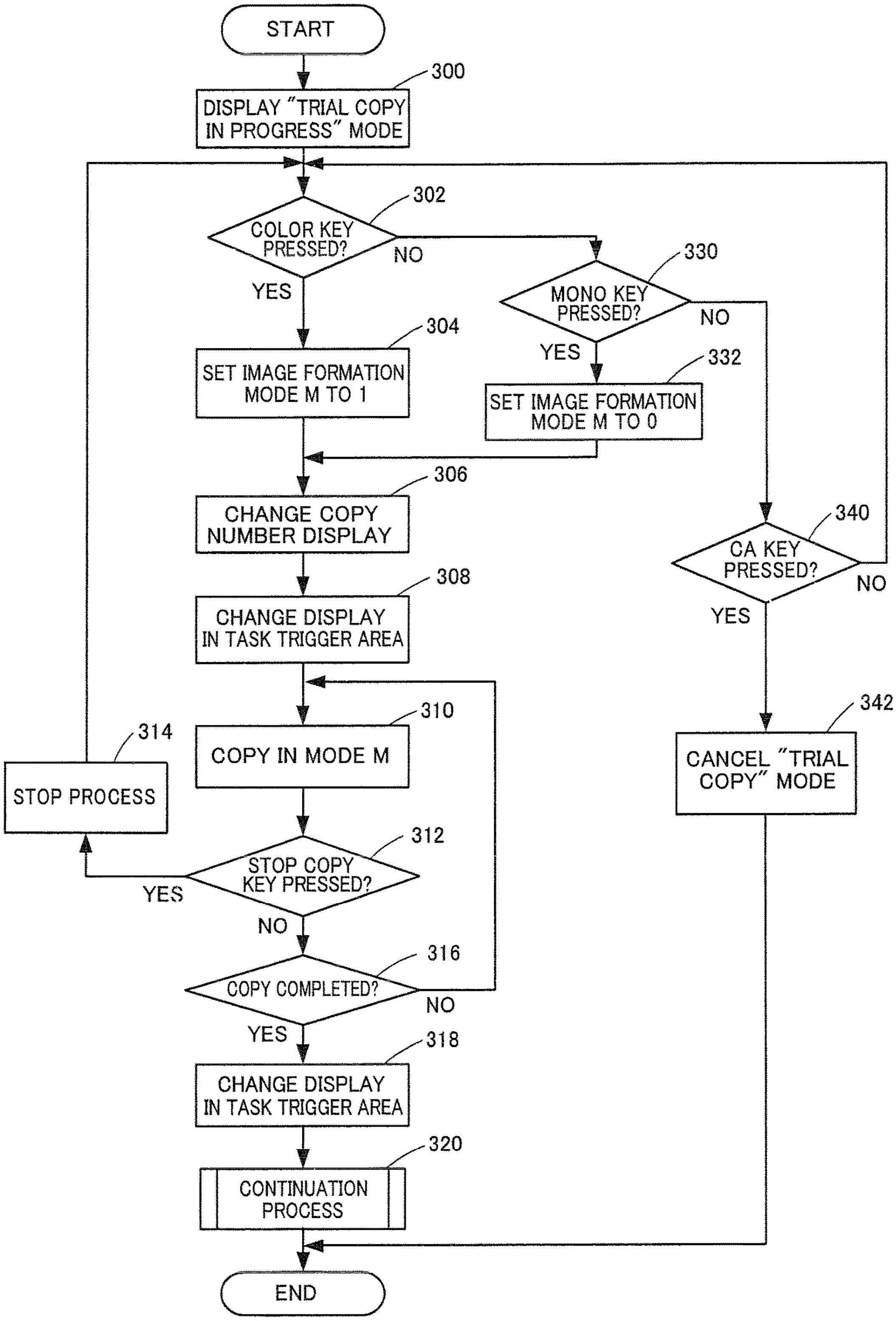
FIG. 4 is a flowchart representing a control structure of a program for realizing the trial copy function in the image forming apparatus in accordance with an embodiment of the present invention.

Referring to FIG. 4, if the trial copy function is selected, at step 300 of the program for realizing the trial copy, CPU 180 displays information indicating that the operation is in the "trial copy" mode, on the screen image displayed on display panel 170.

Figure 6:
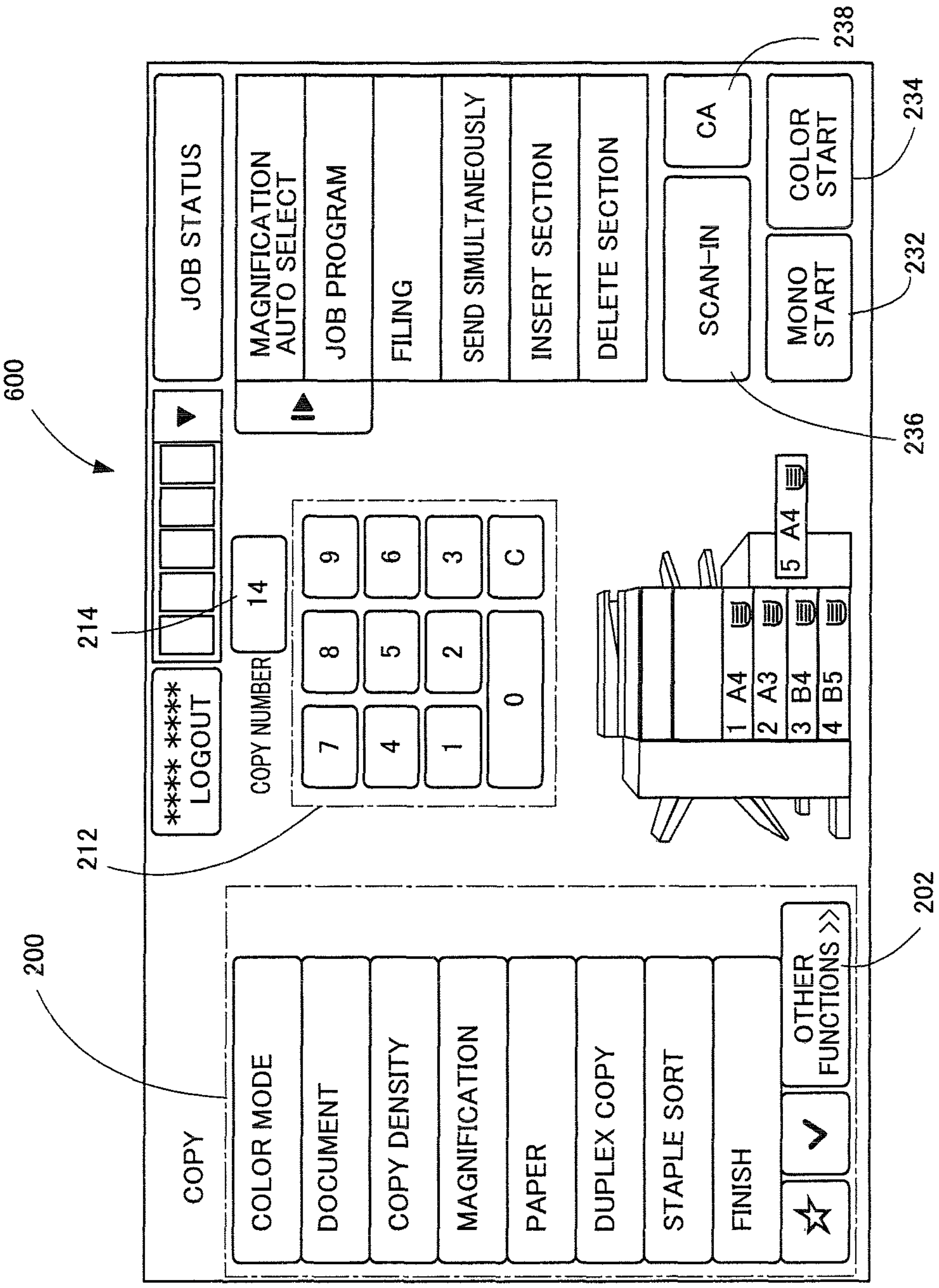
FIG. 6 shows an example of a screen image before the trial copy function is selected, showing the same screen image as that of FIG. 3.
Figure 7:
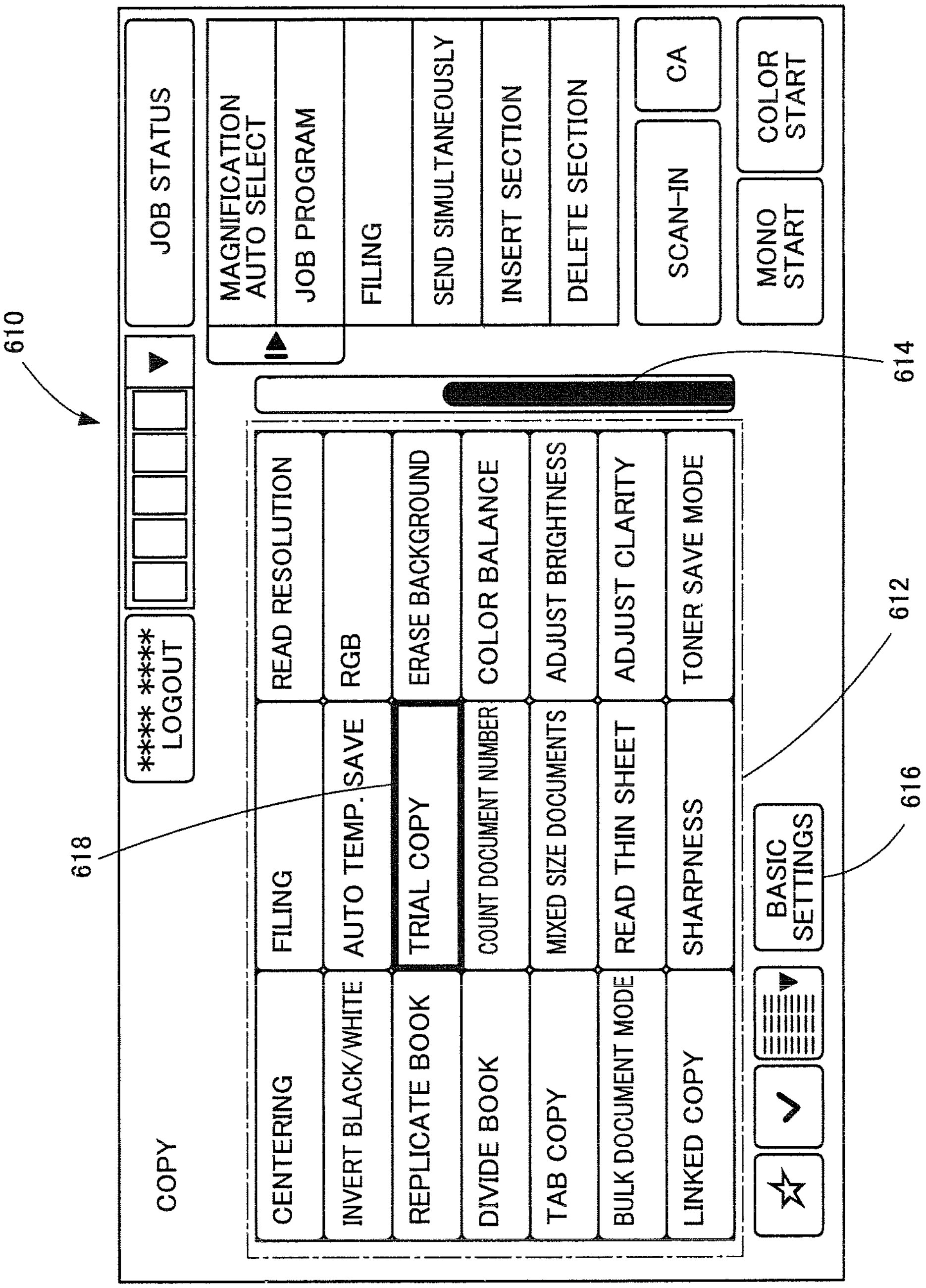
FIG. 7 shows an example of a function list displayed when "other functions" key is pressed on the screen image of FIG. 6.
Figure 8:
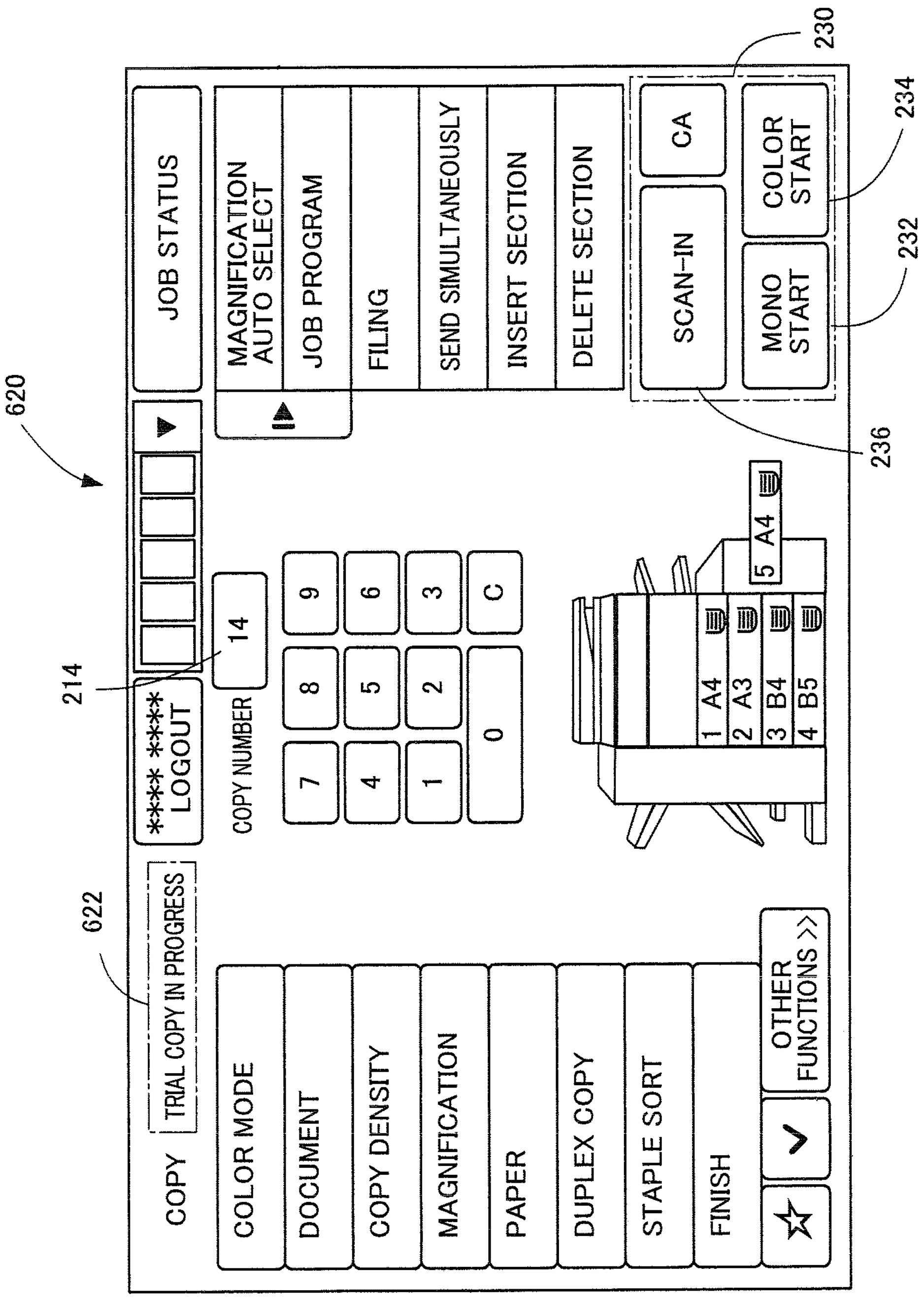
FIG. 8 shows an example of a screen image displayed when the trial copy is selected on the screen image of FIG. 7.

The trial copy function can be selected from function setting area 200 displayed on a first screen image 600 of FIG. 6. Specifically, on the first screen image 600, if other functions key 202 is pressed, a second screen image 610 shown in FIG. 7 is displayed. In FIG. 7, on a function list display area 612 of the second screen image 610, a list of functions is displayed. Since not all functions are displayed, a scroll bar 614 for scrolling the list display is displayed on the right side of function list display area 612. In the second screen image 610, if an area 618 having the indication of "trial copy" is pressed, the trial copy function is selected. Here, selection is indicated by a thick line in FIG. 7. In this state, if a basic setting key 616 is pressed, display of function list display area 612 ends, and a different screen image is displayed. Specifically, a third screen image 620 shown in FIG. 8 is displayed. The third screen image 620 is substantially the same as the first screen image 600 shown in FIG. 6, except that there is an indication 622 of "trial copy in progress" on the upper left portion of the screen image.

With the third screen image 620 being displayed, at step 302, CPU 180 determines whether or not color start key 234 has been pressed. If color start key 234 is pressed, control proceeds to step 304. At step 304, CPU 180 sets a parameter M for designating an image formation mode to "1". Thereafter, control proceeds to step 306. If color start key 234 is not pressed, control proceeds to step 330. Parameter M is stored, for example, in RAM 184.

At step 330, CPU 180 determines whether or not monochrome start key 232 has been pressed. If monochrome start key is pressed, control proceeds to step 332. At step 332, CPU 180 sets the parameter M for designating the image formation mode to "0". Thereafter, control proceeds to step 306. If monochrome start key 232 is not pressed, control proceeds to step 340.

At step 340, CPU 180 determines whether or not CA key 238 has been pressed. If CA key 238 is pressed, control proceeds to step 342. At step 342, CPU 180 cancels the trial copy mode, and the present program ends. If CA key 238 is not pressed, control returns to step 302.

Figure 9:
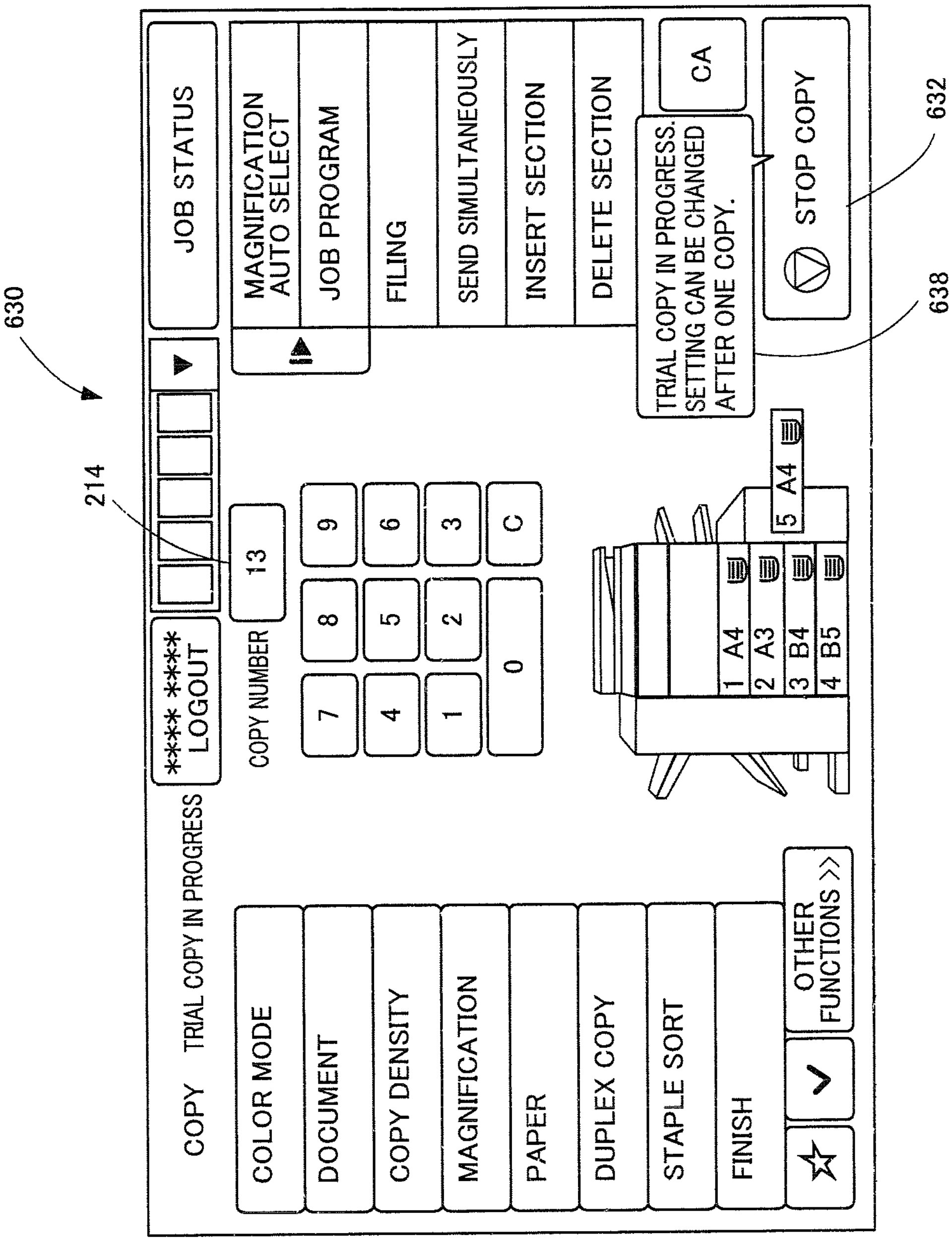
FIG. 9 shows an example of a screen image displayed when a monochrome start key or a color start key is pressed on the screen image of FIG. 8.

At step 306, CPU 180 decreases the numerical value in a copy number display area 214 of the third screen image 320 by "1". Further, at step 308, CPU 180 changes the display of task trigger area 230 on the third screen image 620. Specifically, CPU 180 displays a fourth screen image 630 shown in FIG. 9. In the fourth screen image 630, the number of copies is changed to "13", and monochrome start key 232 and color start key 234 are changed to stop copy key 632. At the same time, a first balloon 638 including help information (information indicating the state of image forming apparatus 150 and information assisting the operation by the user) is displayed to hide scan-in key 236.

At step 310, in accordance with the value of parameter indicating the image forming mode, CPU 180 controls document reading unit 152, image processing unit 188, image memory 190 and image forming unit 154 and thereby reads the document and executes color copy (when M=1) or monochrome copy (when M=0). Here the image data obtained by reading the document is stored in image memory 190, and used when copy is taken at a subsequent step.

With the fourth screen image 630 being displayed, at step 312, CPU 180 determines whether or not stop copy key 632 is pressed. If stop copy key 632 is pressed, control proceeds to step 314. At step 314, CPU 180 stops copying and on the fourth screen image 630, returns the copy number and the display of task trigger area 230 to the original state (that is, to the third screen image 620). Thereafter, control returns to step 302. If stop copy key 632 is not pressed, control proceeds to step 316.

At step 316, CPU 180 determines whether or not one copy (trial copy) is completed. If the one copy has not yet been completed, control returns to step 310 and if completed, control proceeds to step 318. In this manner, through steps 310, 312, 314 and 316, if a stop operation is made by the user during copying one trial copy, the one copy is stopped.

Figure 10:
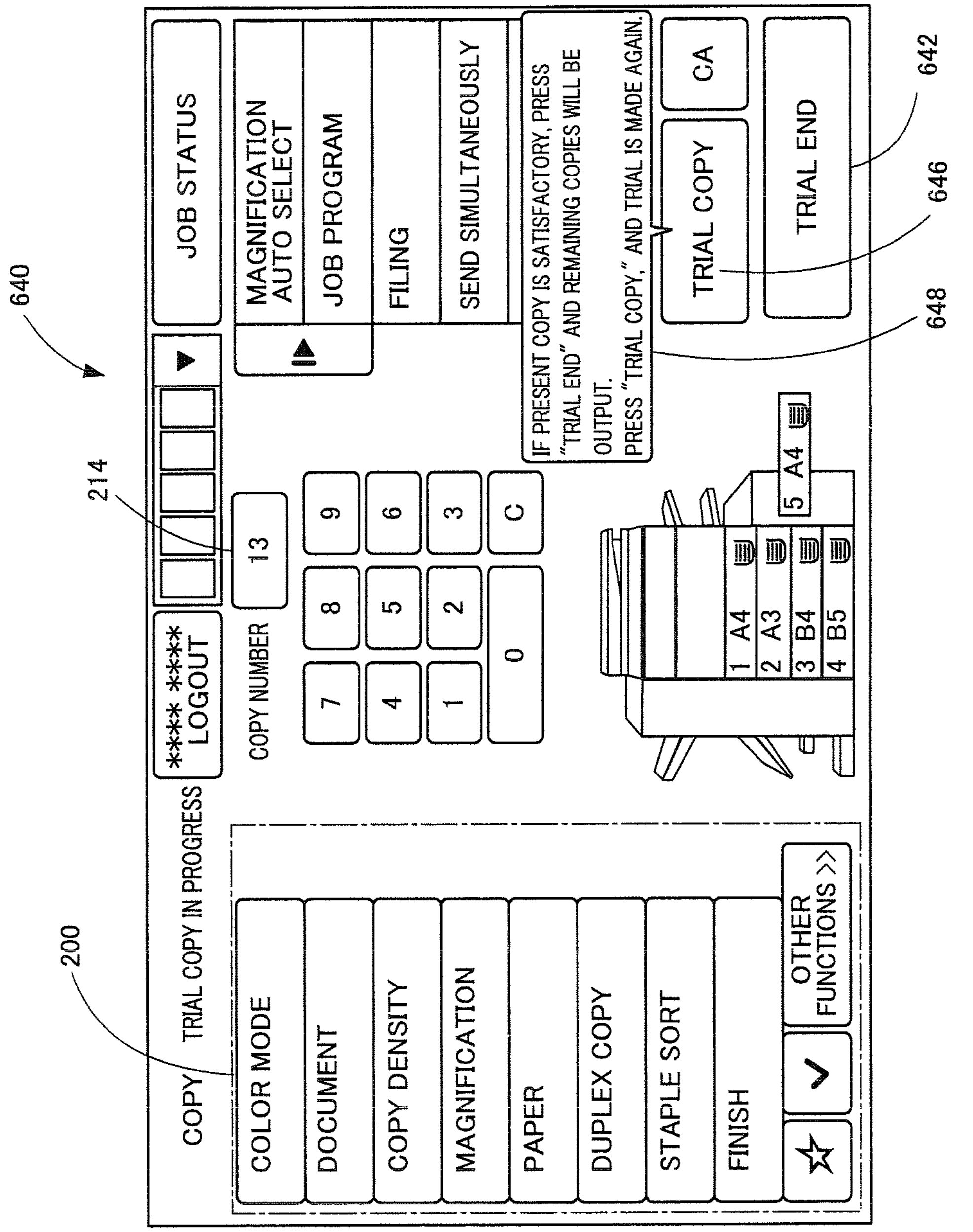
FIG. 10 shows an example of screen image displayed after completion of output of one copy, in the trial copy mode.

At step 318, CPU 180 changes the display in the task trigger area of the fourth screen image 630, and after executing the continuation process of step 320, ends the present program of realizing the trial copy function. Specifically, at step 318, CPU 180 displays a fifth screen image 640 shown in FIG. 10, and waits for a user operation. When we compare the fifth screen image 640 with the preceding fourth screen image 630, it can be seen that stop copy key 632 is changed to trial end key 642, the first balloon 638 is erased and trial copy key 646 is displayed at that portion. In the fifth screen image 640, a second balloon 648 including help information for assisting user operation is displayed. When we compare the fifth screen image 640 with the first screen image 600 and the third screen image 620, it can be seen that monochrome start key 232 and color start key 234 are changed to trial end key 642, and scan-in key 236 is changed to trial copy key 646.

Figure 5:
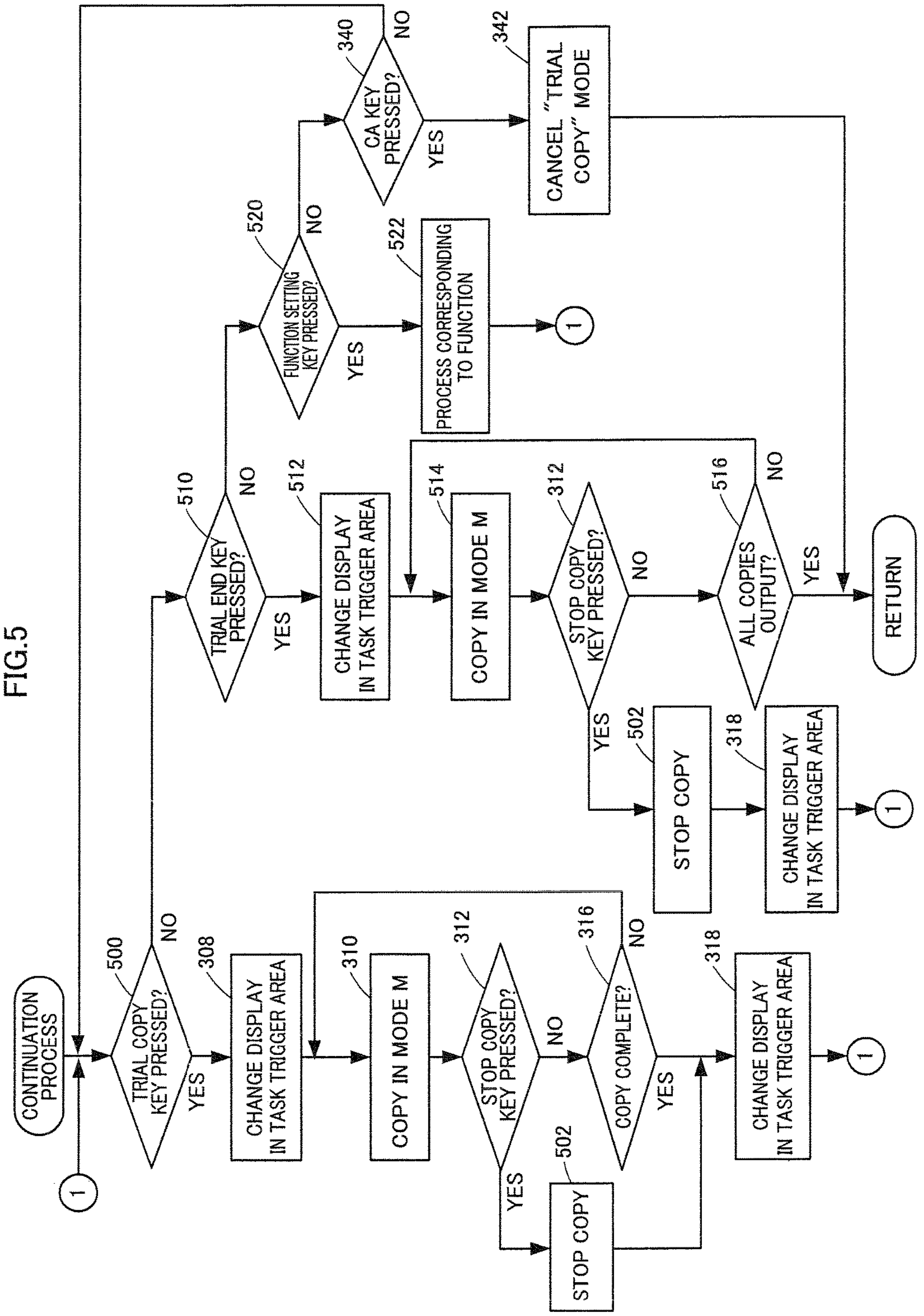
FIG. 5 is a flowchart representing a control structure of a program for realizing the continuation process shown in FIG. 4.

Referring to FIG. 5, at step 500 of the program for realizing the continuation process at step 320, with the fifth screen image 640 being displayed, CPU 180 determines whether or not trial copy key 646 has been pressed. If trial copy key 646 is pressed, control proceeds to step 308 and if not, control proceeds to step 510.

Steps 310, 312, 316 and 318 shown in FIG. 5, executed if trial copy key 646 is pressed, are the same as steps 310, 312, 316 and 318 of FIG. 4. Therefore, description thereof will not be repeated here. It is noted that step 502 executed if stop copy key 632 is pressed with the fourth screen image 630 being displayed at step 312 is different from step 314 shown in FIG. 4. At step 502, CPU 180 simply stops copying, and the number of copies is not returned to the original value. Thereafter, control proceeds to step 318.

At step 510, with the fifth screen image 640 being displayed, CPU 180 determines whether or not trial end key 642 has been pressed. If trial end key 642 is pressed, control proceeds to steps 512 to execute copying of remaining number, and if not, control proceeds to step 520.

Figure 11:
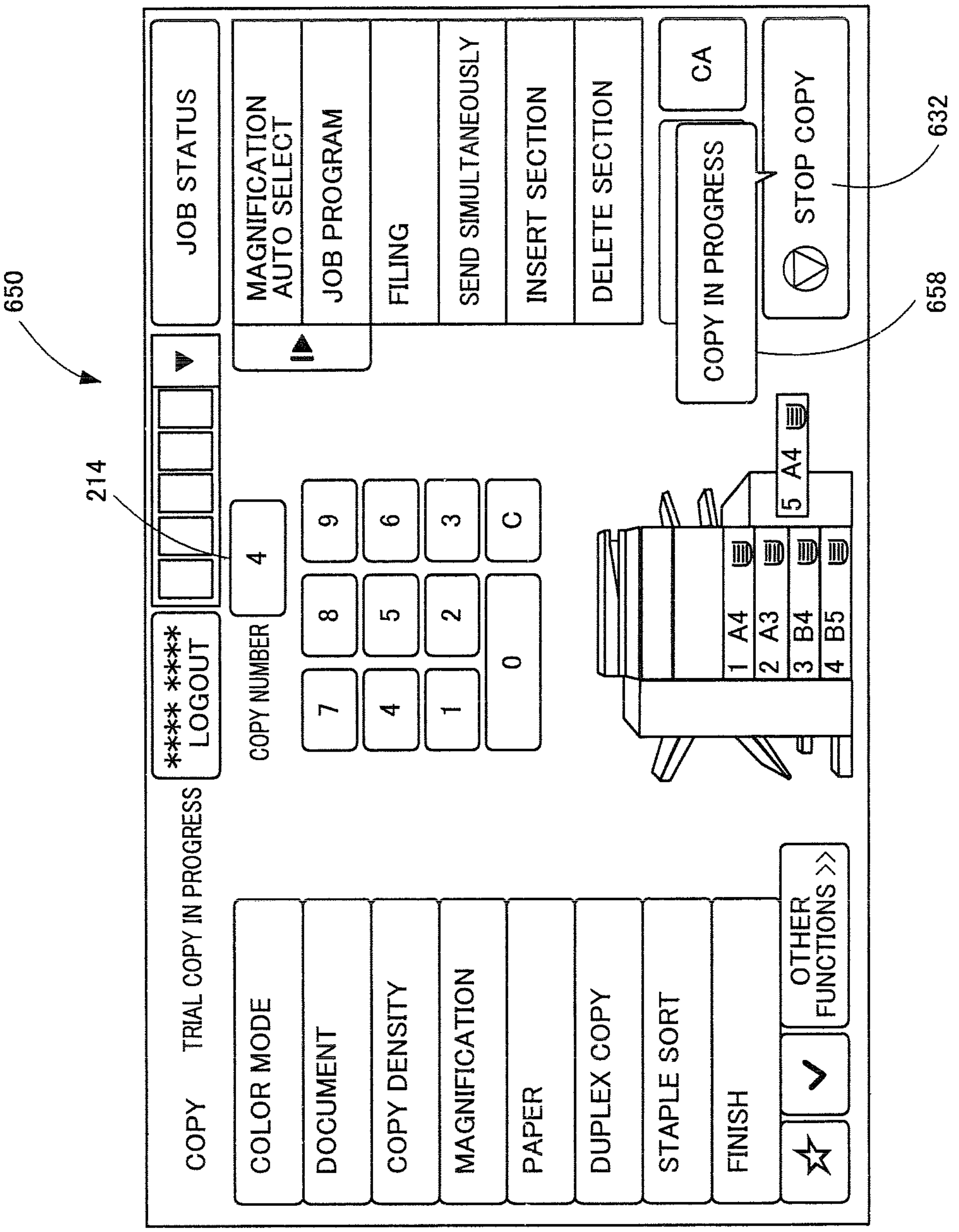
FIG. 11 shows an example of a screen image displayed when a trial end key is pressed, in the trial copy mode.

At step 512, CPU 180 changes the display of task trigger area 230 of the fifth screen image 640. Specifically, CPU 180 displays the sixth screen image 650 shown in FIG. 11. In the sixth screen image 650, trial end key 642 of the fifth screen image 640 is changed to stop copy key 632, and the second balloon 648 is erased. Further, a third balloon including help information indicating that copying is in progress is displayed on trial copy key 646.

At step 514, in accordance with the value of parameter M indicating the image forming mode, CPU 180 controls image processing unit 188, image memory 190 and image forming unit 154 and executes color copy (when M=1) or monochrome copy (when M=0), to provide the remaining number of copies (here, 13 copies). Every time printing of one copy ends, CPU 180 decreases the number of printing displayed on the screen image by "1". Here, since image data read and stored in image memory 190 at step 310 is used, document reading unit 152 is not driven.

With the sixth screen image 650 being displayed, at step 312, CPU 180 determines whether or not stop copy key 632 has been pressed. If stop copy key 632 is pressed, control proceeds to step 502. At step 510, CPU 180 stops copying, and on the sixth screen image 650, returns the display of task trigger area 230 to the original state (that is, to the fifth screen image 640). Thereafter, control returns to step 302. If stop copy key 632 is not pressed, control returns to step 516.

At step 516, CPU 180 determines whether or not copying of the remaining number of copies has been all completed. By way of example, using a parameter representing the number of copies displayed on the screen image, by decreasing the parameter value by "1" every time one copy is printed, it is possible to determine whether all copies have been completed, by checking whether or not the parameter value is "0". If not all copies have been completed, control returns to step 514. If all copies are completed, the control returns to the main routine and the present program ends. In this manner, through steps 514, 312 and 516, if a stop operation by the user is received while the process of copying the remaining number is being executed, the copy operation is stopped.

Figure 12:
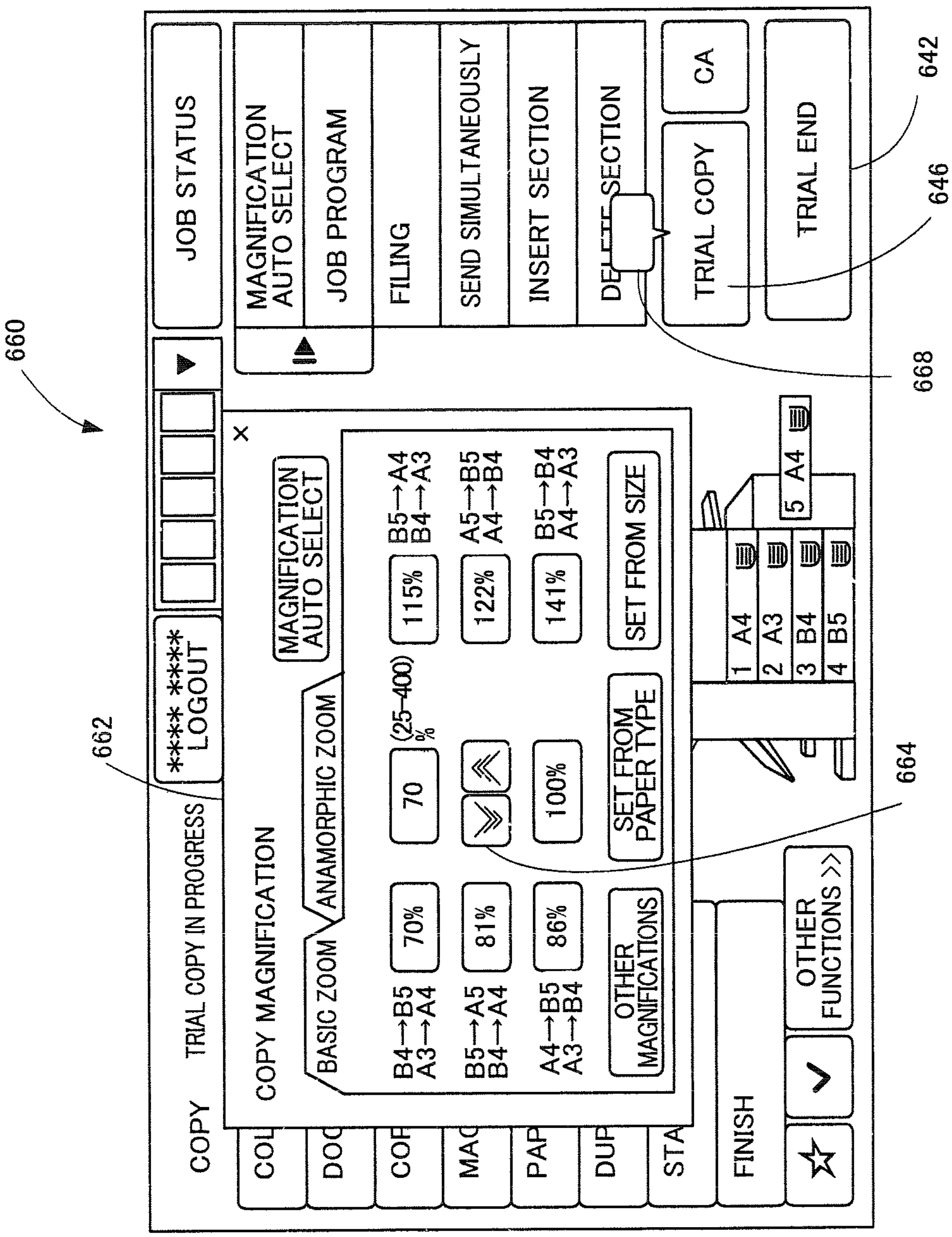
FIG. 12 shows an example of a screen image displayed when a function setting key is pressed on the screen image of FIG. 10.

At step 520, CPU 180 determines whether or not a function setting key in function setting area 200 of the fifth screen image 640 has been pressed. If any function setting key is pressed, control proceeds to step 522. At step 522, CPU 180 displays a corresponding setting screen image, and waits for user operation. FIG. 12 shows an example when a magnification key is selected as the function setting key. On a seventh screen image 660 shown in FIG. 12, a magnification setting window 662 is displayed overlapped on the fifth screen image 640, and in place of the second balloon 648, a fourth balloon 668 is displayed. When magnification setting window is displayed, the second balloon interferes with the view and, therefore, the fourth balloon 668 including only the information that the second balloon 648 exists and not the specific help information, is displayed.

Setting of copy magnification using magnification setting window 662 is realized by pressing a key of percentage indication and thereby directly designating the magnification, or by designating a numerical value in the range of 25 to 400 by pressing up and down keys 664. After the completion of setting, magnification setting window 662 is closed (for example, the sign "×" at the upper right corner is pressed), and then the display returns to the fifth screen image 640, in which the second balloon 648 including the help information appears in place of the fourth balloon 668.

In this manner, if trial end key 642 or trial copy key 646 is pressed after a function setting key is pressed and the function setting is changed, the copy process is executed in accordance with the changed conditions, at step 310 or at step 514.

Step 340 of determining whether or not CA key 238 has been pressed, and step 342 executed if CA key 238 is pressed, are the same as steps 340 and 342 shown in FIG. 4. Therefore, description thereof will not be repeated here. It is noted, however, that at step 340 shown in FIG. 5, if CA key 238 is not pressed, control returns to step 500.

As described above, when the user uses the trial copy function and makes one copy at first, it is possible for the user to start copying by pressing the normal copy start key (monochrome start key 232 or color start key 234) displayed on the task trigger area. Copy instruction thereafter can be given by using trial end key 642 and trial copy key 646, which are different from the normal copy start keys, displayed on the task trigger area. Specifically, the user evaluates the result of one copy, and if it is unsatisfactory, he/she may change setting by using the function setting key or keys, and then by pressing trial copy key 646, the user can repeat printing one copy until satisfactory result is obtained. After the satisfactory finish is obtained, the remaining number of copies can be taken by pressing trial end key 642. In this manner, since the keys related to trial copy are displayed in place of normally displayed keys in the task trigger area, erroneous operation by the user can be reduced, and the user can safely execute the trial copy function.

Further, in the trial copy mode, help information is displayed in a balloon in or around the task trigger area and, therefore, erroneous operation by the user can further be reduced.

Figure 13:
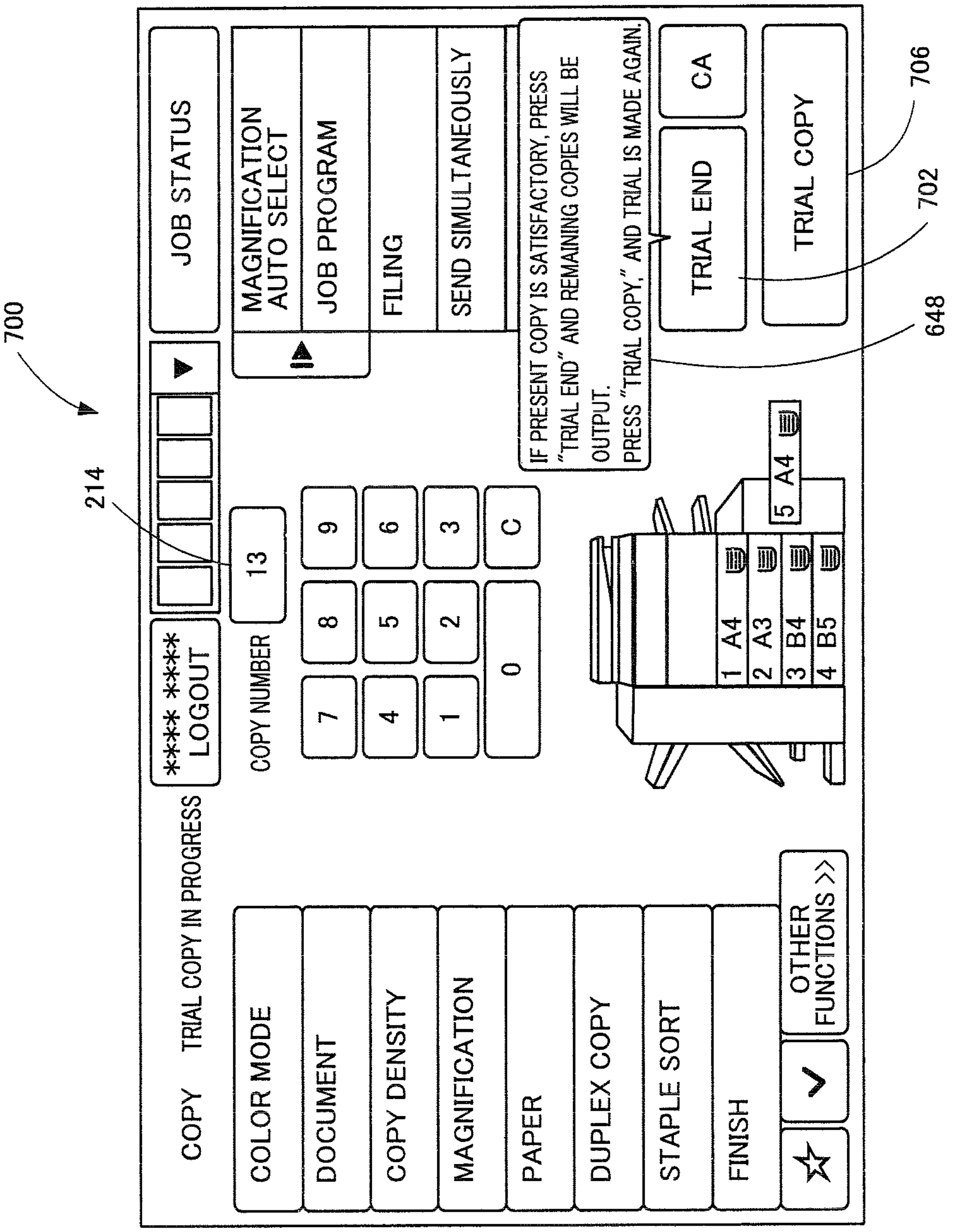
FIG. 13 shows another example of the screen image displayed after completion of output of one copy, in the trial copy mode.

In the foregoing, an example has been described in which monochrome start key 232 and color start key 234 of the third screen image 620 are changed to trial end key 642 in the fifth screen image 640, and scan-in key 236 of the third screen image 620 is changed to trial copy key 646 in the fifth screen image 640. The example, however, is not limiting. By way of example, a trial end key 702 and a trial copy key 706 may be displayed as shown in the eighth screen image 700 of FIG. 13. In the eighth screen image 700, the positions of trial end key and trial copy key are reversed from the fifth screen image 640. Specifically, in the eighth screen image 700 shown in FIG. 13, monochrome start key 232 and color start key 234 of the third screen image 620 are changed to trial copy key 706, and scan-in key 236 of the third screen image 620 is changed to trial end key 702.

Further, the positions for displaying the first to fourth balloons are not limited to the positions described above. Specifically, the first balloon 638 and the third balloon 658 displayed during the copying operation are used for displaying the state of image forming apparatus 150 and, besides, for hiding unnecessary keys displayed in the task trigger area. Therefore, the first and third balloons 638 and 658 may be displayed in any manner provided that keys other than stop copy key 632 and CA key 238 that may be operated during the copying operation are hidden. These balloons may be displayed with the size and position changed appropriately in accordance with the key arrangement in the task trigger area.

Further, the condition for displaying the second balloon 648 in a smaller size such as the fourth balloon 668 is not limited to the condition described above (when function setting is to be done), and it may be displayed in a smaller size when a different condition is satisfied. For example, the second balloon 648 may be displayed in a smaller size if it is pressed, or if a prescribed time passes after the second balloon 648 is displayed.

Further, the condition for returning the displayed small fourth balloon 668 to the original second balloon 648 is not limited to the condition described above (when function setting is completed). By way of example, the second balloon 648 may be displayed if the fourth balloon 668 is pressed.

Though an image forming apparatus capable of monochrome copy and color copy has been described as an example, it is not limiting. For instance, the image forming apparatus may have the monochrome copy function only and may not have the color copy function. In that case, the color start key is not displayed on the display panel and a simple copy start key (corresponding to the monochrome start key) is displayed. When the trial copy function is to be executed, the copy start key may be changed to the trial copy key or to the trial end key.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus including a display unit having a screen, and an input unit that is arranged on said display unit and specifies a designated position on said screen, and having a trial copy function of producing, in response to an instruction to produce multiple set of copies of a document, a trial copy to allow a user to confirm that said trial copy is well; wherein when said trial copy function is designated and a position of a copy start key set displayed on said screen is specified by said input unit, after said trial copy is produced, a first key that starts production of an additional trial copy regardless of whether or not a setting has been changed, and a second key that produces copies of a remaining number of a set number of copies are displayed on said screen.

2. The image forming apparatus according to claim 1, wherein said display unit changes said copy start key set to said first key or said second key.

3. The image forming apparatus according to claim 1, wherein said copy start key set includes a monochrome copy start key and a color copy start key; and said display unit changes said monochrome copy start key and said color copy start key to said first key or changes said monochrome copy start key and said color copy start key to said second key.

4. The image forming apparatus according to claim 1, wherein said input unit is a touch-panel.

5. The image forming apparatus according to claim 1, wherein said first and second keys are displayed on an area of said screen including an area where said copy start key set has been displayed, adjacent to and parallel to each other.

6. A control method of controlling an image forming apparatus including a display unit having a screen, and an input unit that is arranged on said display unit and specifies a designated position on said screen, and having a trial copy function of producing, in response to an instruction to produce multiple set of copies of a document, a trial copy to allow a user to confirm that said trial copy is well;

said method comprising the steps of:

determining whether or not said trial copy function is designated;

determining whether or not a position on a copy start key set displayed on said screen is specified by said input unit; and when it is determined that said trial copy function is designated and that a position on said copy start key set displayed on said screen is specified by said input unit, producing said trial copy; and after said trial copy is produced, displaying a first key that starts production of an additional trial copy regardless of whether or not a setting has been changed, and a second key that produces copies of a remaining number of a set number of copies.

7. The control method according to claim 6, wherein at said step of displaying said first and second keys on said screen, said copy start key set is changed to said first key or said second key.

8. The control method according to claim 6, wherein said copy start key set includes a monochrome copy start key and a color copy start key; and at said step of displaying said first and second keys on said screen, said monochrome copy start key and said color copy start key are changed to said first key or said monochrome copy start key and said color copy start key are changed to said second key.

9. The control method according to claim 6, wherein said input unit is a touch-panel.

10. The control method according to claim 6, wherein said first and second keys are displayed on an area of said screen including an area where said copy start key set has been displayed, adjacent to and parallel to each other.

* * * * *